United States Patent
Ke

(10) Patent No.: US 7,677,388 B2
(45) Date of Patent: Mar. 16, 2010

(54) DISK PROTECTING PLATE

(75) Inventor: Wen-Bin Ke, Taoyuan County (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 12/000,693

(22) Filed: Dec. 17, 2007

(65) Prior Publication Data

US 2008/0222669 A1    Sep. 11, 2008

(30) Foreign Application Priority Data

Mar. 9, 2007   (TW) ............................... 96203827 U

(51) Int. Cl.
*G11B 7/24* (2006.01)
(52) U.S. Cl. ................. 206/303; 206/445; 206/308.1
(58) Field of Classification Search ............. 206/308.1, 206/310, 445, 303, 307, 308.3, 493, 585, 206/592, 594, 591, 313; 720/719
See application file for complete search history.

(56) References Cited

U.S. PATENT DOCUMENTS

| | | | | |
|---|---|---|---|---|
| 4,696,394 A | * | 9/1987 | Estkowski et al. | ........... 206/303 |
| 6,119,872 A | * | 9/2000 | Flores et al. | .................. 211/40 |
| 6,296,114 B1 | * | 10/2001 | Bubb et al. | ............... 206/308.1 |
| 7,147,107 B2 | * | 12/2006 | Haggard et al. | ............. 206/710 |
| 7,316,312 B2 | * | 1/2008 | Chiu | ........................... 206/303 |
| 2004/0154938 A1 | * | 8/2004 | Chang | ..................... 206/308.1 |
| 2006/0096881 A1 | * | 5/2006 | Ozaki et al. | ................. 206/445 |
| 2007/0187269 A1 | * | 8/2007 | Grasso et al. | ............ 206/308.1 |

* cited by examiner

*Primary Examiner*—Jacob K Ackun, Jr.
*Assistant Examiner*—Robert Poon
(74) *Attorney, Agent, or Firm*—Bacon & Thomas PLLC

(57) ABSTRACT

A disk protecting plate includes a disk-shaped plate body having a central through hole. The plate body is provided on one side with a centered and low-raised annular wall, and a plurality of reinforcing ribs radially outward extended from the annular wall. Each of the reinforcing ribs has a top gradually inclined toward an outer circumferential periphery of the plate body. The disk protecting plate with the radially outward inclined reinforcing ribs may be made with reduced material to obtain a reinforced overall structural strength without forming an excessively thick outer periphery, and a plurality of disks concentrically stacked and packaged between two pieces of the disk protecting plates could therefore be effectively protected against damage caused by compression or impact against the disk protecting plate.

4 Claims, 6 Drawing Sheets

DISK PROTECTING PLATE

FIELD OF THE INVENTION

The present invention relates to a protecting plate used to protect concentrically stacked and packaged disks, and more particularly to a disk protecting plate that includes radially outward extended and inclined reinforcing ribs to enable reduced material but enhanced reinforcing effect and avoid damage of the protected disks caused by compression or impact against the disk protecting plate.

BACKGROUND OF THE INVENTION

In about 1980, the compact disk (CD) was first introduced to the market jointly by Philips and Sony. The CD is initially developed for the household appliance consumer market instead of computer storage. However, thanks to the easy portability, safety and durability, multimedia nature, big storage capacity, and low manufacturing cost thereof, the CD has been quickly applied in the storing of huge amount of computer data. With the rapidly increased market demands for CDs, many big-scale firms have successively engaged in the production of CDs. As a result, the manufacturing of various kinds of CD-related products, such as storages, containers, and packaging boxes for CDs, is also prosperously developed.

On the other hand, with the popularity of CD-related products and the gradually saturated CD market, and the fact that many local CD-related firms are restricted by foreign patents and have to pay extremely high royalty for producing patented CDs. Therefore, for the purpose to survive in a business environment with high pressure of maintaining basic revenue and profit, a "meager profit" policy has become a new trend in the market. That is, it is a currently very important issue in the business field to develop ways for simplifying manufacturing process to upgrade product quality while effectively lowering the manufacturing and packaging costs.

A typical example of lowering manufacturing and packaging costs is found in Taiwan Patent Publication No. 00570029, which discloses a device for preventing a plurality of concentrically stacked and packaged CDs from deformation. The device includes a plastic film, at least one blank disk, and at least one back-up plate. The blank disk is positioned at an outer end of the stacked CDs, and the back-up plate is positioned between the blank disk and the stacked CDs. When packaging the stacked CDs, the plastic film is covered over an integral body of the stacked CDs, back-up plate, and black disk. In this manner, the CDs are protected against deformation, the time for packaging the CDs may be effectively shortened, and the packaging material may be effectively reduced.

In the above-described CD packaging manner, the packaged CDs are subject to damage caused by minor impact when the back-up plate, is too thin. FIG. 1 shows a somewhat improved back-up plate used in packaging stacked CDs. As shown, the back-up plate of FIG. 1 has a narrow peripheral wall to increase a thickness at a circumferential periphery of the back-up plate, and is provided with a plurality of reinforcing ribs radially extended from a central area of the back-up plate, so as to effectively increase the strength at two ends of the CD package to provide better protection of the packaged CDs against damage caused by minor collision or impact.

Since the above improved back-up plate is only strengthened along the circumferential periphery by the narrow peripheral wall thereof, the narrow peripheral wall of the back-up plate tends to break, crack, and/or collapse when the package of the stacked CDs is subjected to impact during transporting thereof. Even if the packaged CDs are not damaged by such impact, the broken peripheral wall of the back-up plate visible from outside the package would adversely affect an overall appearance of the package to even result in rejection of the packaged CDs.

It is therefore tried by the inventor to develop an improved disk protecting plate to overcome the drawbacks in the CD package protection of prior art.

SUMMARY OF THE INVENTION

A primary object of the present invention is to provide a disk protecting plate that has radially outward extended and inclined reinforcing ribs to enable reduced material but enhanced overall structural strength of the disk protecting plate.

Another object of the present invention is to provide a disk protecting plate that has radially outward extended and inclined reinforcing ribs to enable a reinforced but not too thick circumferential periphery to avoid damage of protected disks caused by compression or impact against the disk protecting plate.

To achieve the above and other objects, the disk protecting plate according to the present invention includes a disk-shaped plate body having a central through hole. The plate body is provided on one side with a centered and low-raised annular wall, and a plurality of reinforcing ribs radially outward extended from the annular wall, and each of the reinforcing ribs has a top gradually inclined toward an outer circumferential periphery of the plate body.

The disk protecting plate with the radially outward inclined reinforcing ribs may be made with reduced material to obtain an enhanced overall structural strength without forming an excessively thick circumferential periphery, and a plurality of disks concentrically stacked and packaged between two pieces of the disk protecting plates could therefore be effectively protected against damage caused by compression or impact against the disk protecting plate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
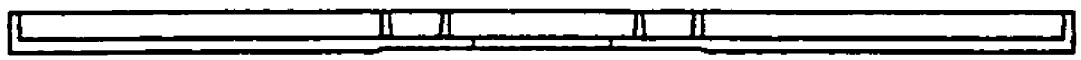
FIG. 1 is a sectioned side view of a disk protecting plate of prior art.
Figure 2:
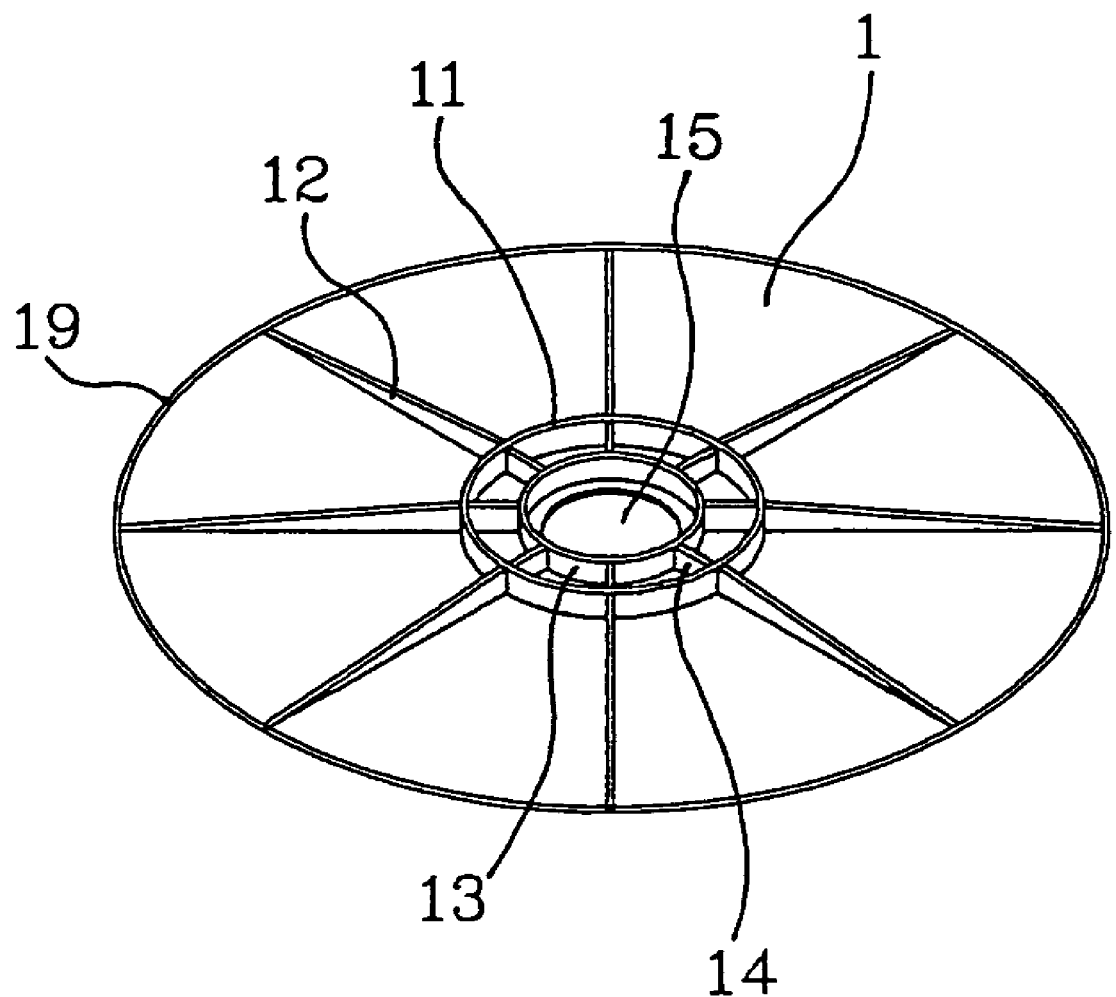
FIG. 2 is top perspective view of a disk protecting plate according to the present invention.
Figure 3A:
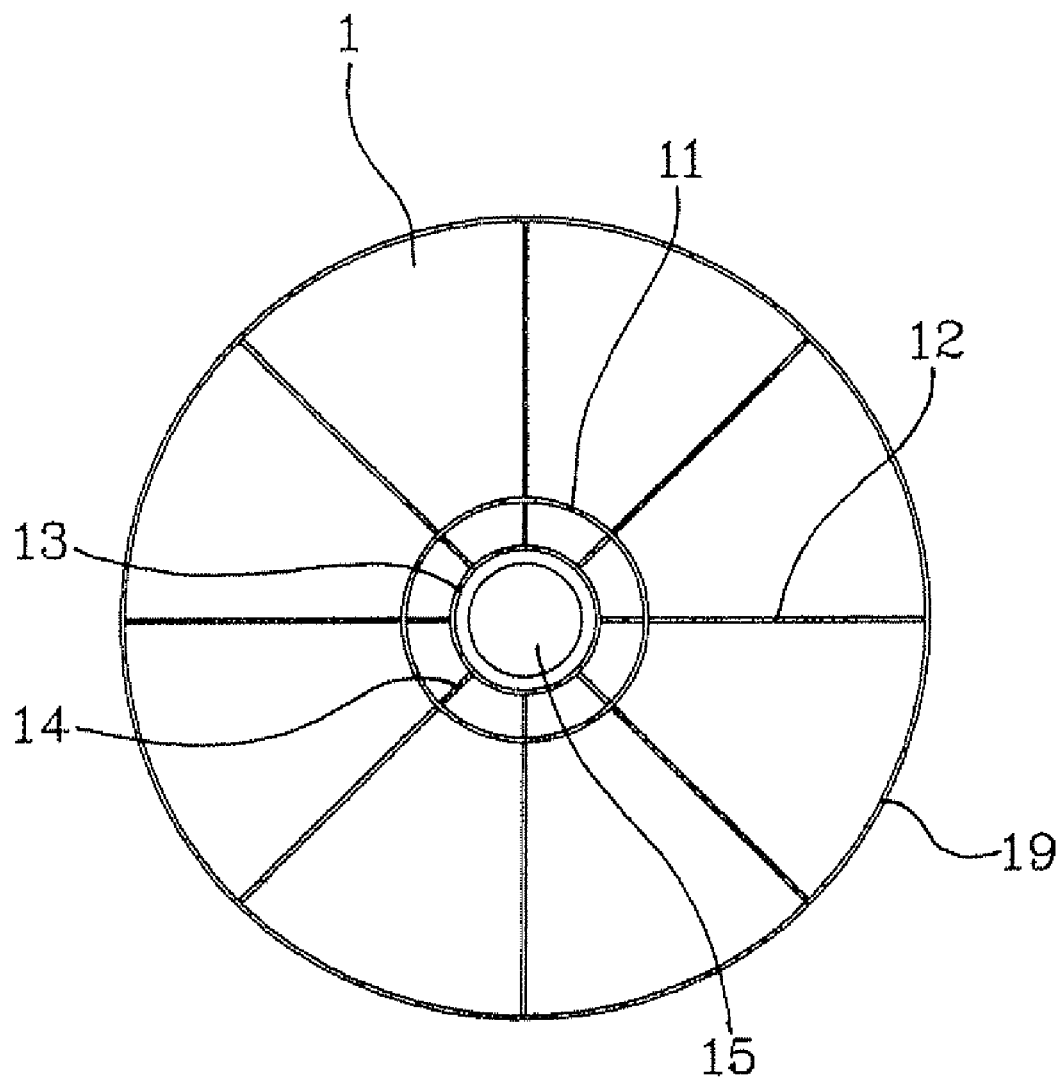
FIG. 3A is a top plan view of the disk protecting plate according to the present invention.
Figure 3B:
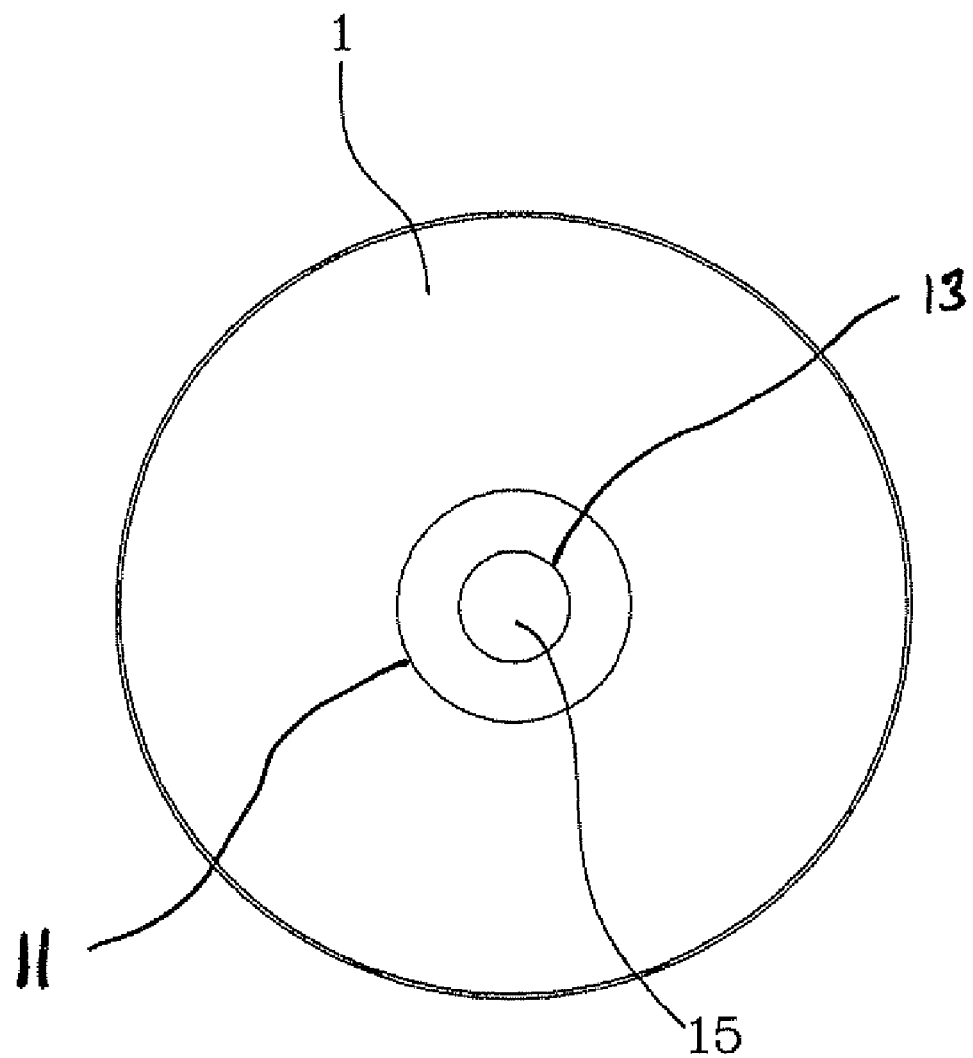
FIG. 3B is a bottom plan view of the disk protecting plate according to the present invention.
Figure 4:
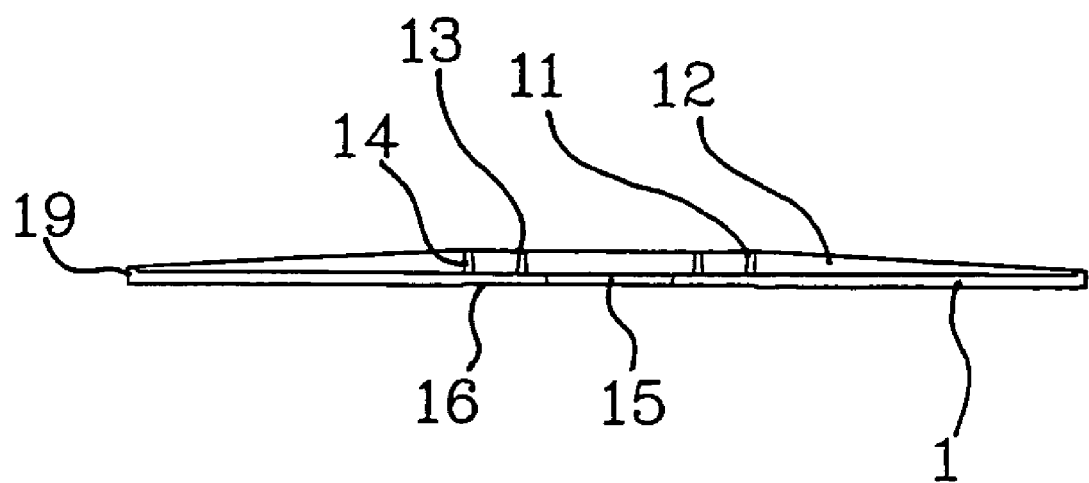
FIG. 4 is a sectioned side view of the disk protecting plate according to the present invention.

Please refer to FIGS. 2 and 3 that are top perspective and plan views, respectively, of a disk protecting plate according to the present invention, and to FIG. 4 that is a sectioned side view of the disk protecting plate.

As shown, the disk protecting plate of the present invention includes a disk-shaped plate body 1 having a central through hole 15. The plate body 1 is provided on a first side with a centered and diametrically larger outer annular wall 11, which is raised from the first side of the plate body 1 by a predetermined short distance. A plurality of reinforcing ribs 12 are radially outward extended from and equally spaced along the outer annular wall 11. Each of the reinforcing ribs 12 has a top gradually inclined toward an outer circumferential periphery of the plate body 1. A diametrically smaller inner annular wall 13 may be further formed on the first side of the plate body 1 to be concentric with the outer annular wall 11. A plurality of low-raised reinforcing ribs 14 are radially provided on the first side of the plate body 1 between the outer annular wall 11 and the inner annular wall 13 to effectively enhance a central structural strength of the whole plate body 1.

The reinforcing ribs 12 may be right-angle triangles in shape.

The plate body 1 is provided along the outer circumferential periphery with a peripheral wall 19, which has a height preferably from about 1.2 to about 2 times of a thickness of the plate body 1 to provide an optimal supporting and reinforcing effect.

The disk protecting plate of the present invention is also formed on an opposite second side at a central area with a round recess 16, with which a plurality of concentrically stacked disks 2 is aligned.

Figure 5:
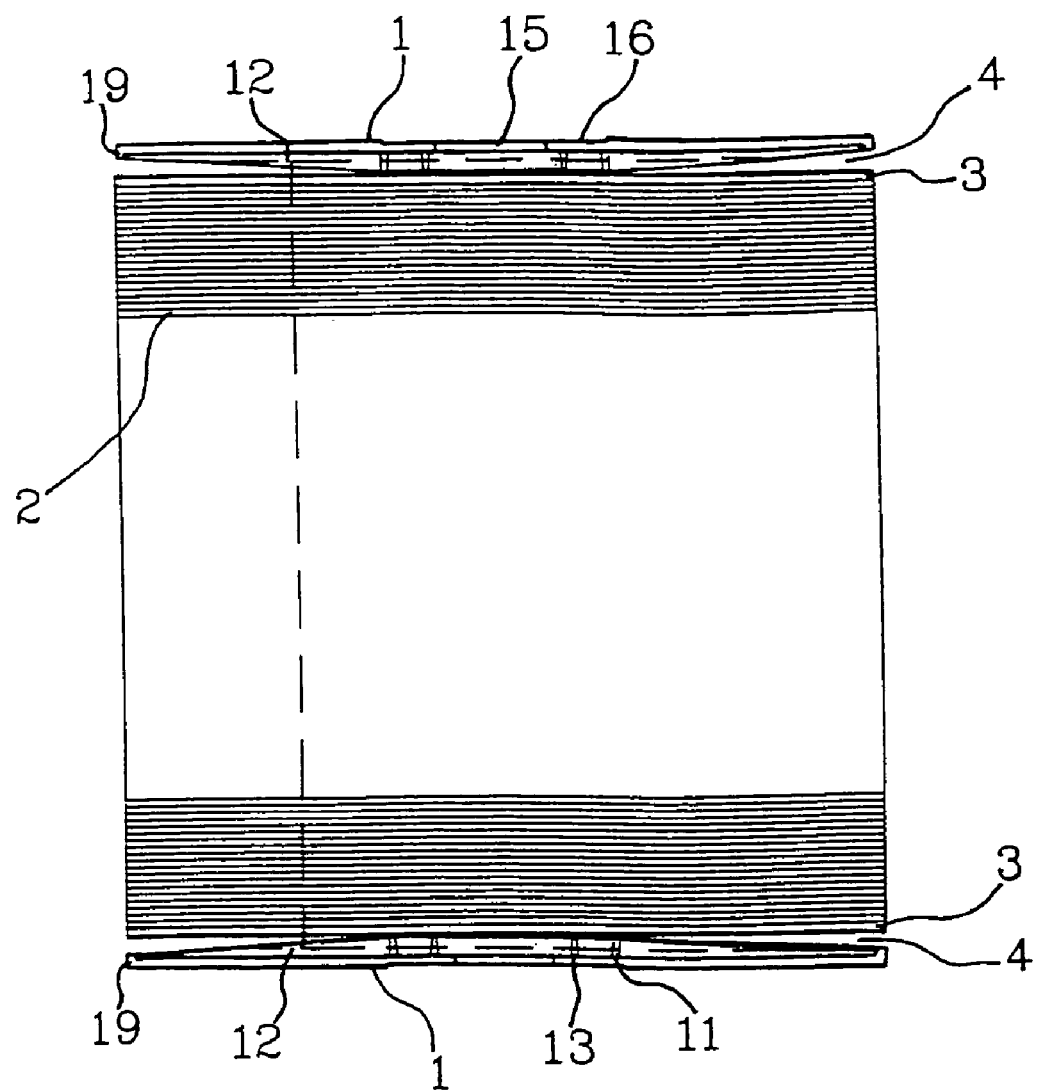
FIG. 5 shows the use of two disk protecting plates of the present invention to protect a plurality of compact disks coaxially stacked and packaged between the disk protecting plates.

Please refer to FIG. 5. To package a plurality of concentrically stacked compact disks 2, two pieces of the disk protecting plates of the present invention may be separately positioned outside two back-up plates 3 at two outer-ends of the stacked compact disks 2 with the first side of the disk protecting plates facing inward, such that a substantially lying-V sectioned and sideward opened narrow space 4 is formed around between each back-up plate 3 and the disk protecting plate of the present invention. With the lying-V sectioned space 4, a compression or impact against the plate body 1 of the disk protecting plate may be buffered without causing damage to the compact disks 2. In other words, with the disk protecting plates of the present invention positioned at two outer ends of the stacked and packaged compact disks 2, the compact disks 2 are more effectively protected against damage.

The disk protecting plate of the present invention has a simplified structure to enable reduced material and accordingly, reduced manufacturing cost thereof. The peripheral wall 19 has a suitable height, which cooperates with the radially outward inclined reinforcing ribs 12 to enhance an overall structural strength of the disk protecting plate without producing an excessively high circumferential edge on the disk protecting plate. Therefore, the confusion of rejected shipment of compact disks 2 due to the edge-damaged back-up plates as would occur in the conventional disk protection could be effectively avoided.

The disk protecting plate of the present invention may be applied in the safe packaging of various types of stacked disks, including compact disks (CDs), digital versatile disks (DVDs), etc., to provide industrially economical benefit.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A disk protecting plate for protecting concentrically stacked and packaged disks, comprising a disk-shaped plate body having a central through hole formed therein; the plate body being provided on a first side with a centered outer annular wall having a diameter larger than a diameter of the central through hole, the outer annular wall being raised from the first side of the plate body by a predetermined short distance, and a plurality of first reinforcing ribs radially outwardly extended from and equally spaced along the outer annular wall; and each of the first reinforcing ribs having a top gradually inclined toward an outer circumferential periphery of the plate body, allowing the plate body to be made with reduced material but enhanced structural strength, wherein when the disks are stacked and packaged between two pieces of the plate bodies the disks are effectively protected against damage, wherein the plate body is further provided on the first side with an inner annular wall concentric with the outer annular wall and having a diameter smaller than the diameter of the outer annular wall, a plurality of low-raised second reinforcing ribs are radially extended between the outer annular wall and the inner annular wall and the plate body has a round recess on a second side opposite to the first side of the plate body at a central portion thereof.

2. The disk protecting plate as claimed in claim 1, wherein the first reinforcing ribs are right-angle triangles in shape.

3. The disk protecting plate as claimed in claim 1, wherein the plate body is provided on the first side along the outer circumferential periphery with a peripheral wall, which has a height from about 1.2 to about 2 times of a thickness of the plate body.

4. The disk protecting plate as claimed in claim 1 in combination with a back-up plate configured for positioning at a first outer end of the concentrically stacked disks, wherein the plate body is positioned with the first side facing toward the first outer end of the stacked disks, such that a substantially lying-V sectioned and sideward opened narrow space is formed between the plate body and the back-up plate to buffer a compression or impact against the plate body to avoid damaging of the stacked disks due to such compression or impact.

\* \* \* \* \*